US009002029B2

(12) United States Patent
Tanaka

(10) Patent No.: US 9,002,029 B2
(45) Date of Patent: Apr. 7, 2015

(54) HOWLING CANCELLER

(75) Inventor: Ryo Tanaka, Hamamatsu (JP)

(73) Assignee: Yamaha Corporation (JP)

( * ) Notice: Subject to any disclaimer, the term of this patent is extended or adjusted under 35 U.S.C. 154(b) by 545 days.

(21) Appl. No.: 13/384,395

(22) PCT Filed: Jul. 14, 2010

(86) PCT No.: PCT/JP2010/061923

§ 371 (c)(1),
(2), (4) Date: Jan. 17, 2012

(87) PCT Pub. No.: WO2011/007813

PCT Pub. Date: Jan. 20, 2011

(65) Prior Publication Data

US 2012/0128167 A1 May 24, 2012

(30) Foreign Application Priority Data

Jul. 17, 2009 (JP) ................................ 2009-168559

(51) Int. Cl.
*H04B 15/00* (2006.01)
*H04R 3/02* (2006.01)

(52) U.S. Cl.
CPC ........................................ *H04R 3/02* (2013.01)

(58) Field of Classification Search
USPC ........... 381/92, 93, 94.1, 94.2, 94.3, 94.8, 95, 381/96, 83, 66, 58, 59, 71.1, 61, 103; 379/406.04, 406.06, 406.07, 379/406.12–406.14
See application file for complete search history.

(56) References Cited

U.S. PATENT DOCUMENTS

| | | | | |
|---|---|---|---|---|
| 7,133,529 | B2 | 11/2006 | Ura | |
| 7,912,230 | B2 | 3/2011 | Kawamura et al. | |
| 2005/0254640 | A1 | 11/2005 | Ohki et al. | |
| 2006/0227978 | A1 | 10/2006 | Truong et al. | |
| 2007/0104335 | A1 * | 5/2007 | Shi et al. | 381/93 |
| 2008/0285774 | A1 | 11/2008 | Kanamori et al. | |

FOREIGN PATENT DOCUMENTS

| | | | |
|---|---|---|---|
| CN | 1741686 | A | 3/2006 |
| JP | 2000-354292 | A | 12/2000 |
| JP | 2004-023722 | A | 1/2004 |

(Continued)

OTHER PUBLICATIONS

English translation of International Preliminary Report on Patentability issued in PCT/JP2010/061923 dated Feb. 16, 2012.

(Continued)

*Primary Examiner* — Vivian Chin
*Assistant Examiner* — Friedrich W Fahnert
(74) *Attorney, Agent, or Firm* — Rossi, Kimms & McDowell LLP

(57) ABSTRACT

A howling canceller applied to an acoustic system having a speaker and a microphone comprises: a filter insertion unit for inserting a notch filter at a frequency of an audio signal picked up by the microphone; a setting unit for setting the insertion time of the notch filter on the basis of the frequency at which the notch filter is inserted; and a releasing unit for, when the insertion time set by the setting unit has elapsed, releasing the notch filter, the insertion time of which has elapsed. The setting unit sets the insertion time of the notch filter to be shorter as the frequency at which the notch filter is inserted increases.

10 Claims, 4 Drawing Sheets

(56) References Cited

FOREIGN PATENT DOCUMENTS

| | | | |
|---|---|---|---|
| JP | 2008-017244 | A | 1/2004 |
| JP | 2004-200883 | A | 7/2004 |
| JP | 2004-254016 | A | 9/2004 |
| JP | 2005-341129 | A | 12/2005 |
| JP | 2006197496 | A | 7/2006 |
| JP | 2006-217542 | A | 8/2006 |
| JP | 2008-005305 | A | 1/2008 |
| WO | 2005/125273 | A1 | 12/2005 |

OTHER PUBLICATIONS

Extended European Search Report issued in counterpart application No. EP10799871.8, dated Sep. 3, 2013.

International Search Report for JP/2010/061922, dated Sep. 7, 2010.

Co-pending U.S. Appl. No. 13/383,871.

Co-Pending U.S. Appl. No. 13/383,871.

European Extended Search Report issued in European application No. EP10799870.0, dated Dec. 17, 2013. Related U.S. Appl. No. 13/383,871.

Search Report issued in PCT/2010/061923 dated Oct. 12, 2010.

Notification of the First Office Action for corresponding CN 201080032205.8, dated Jan. 6, 2014. English translation provided.

Notification of Second Office Action issued in CN 201080032205, dated Jul. 29, 2014. English translation provided.

Non-Final Office Action dated Apr. 25, 2014 issued in U.S. Appl. No. 13/383,871.

Non-Final Office Action dated Aug. 5, 2014 issued in U.S. Appl. No. 13/383,871.

* cited by examiner

FIG. 2

| NOTCH FILTER | CENTRAL FREQUENCY | BANDWIDTH | GAIN AMOUNT |
|---|---|---|---|
| FILTER 13A | 100Hz | 10Hz | −24dB |
| FILTER 13B | | | |
| FILTER 13C | 1. 2kHz | 0. 1kHz | −24dB |
| ... | ... | ... | ... |

HOWLING CANCELLER

This application is a U.S. National Phase Application of PCT International Application PCT/JP2010/061923, filed on Jul. 14, 2010, which is based on and claims priority from JP 2009-168559, filed on Jul. 17, 2009. The contents of the documents cited in this paragraph are hereby incorporated herein by reference in their entireties.

TECHNICAL FIELD

The invention relates to a howling canceller that suppresses howling occurring in an acoustic feedback loop from a speaker to a microphone.

BACKGROUND ART

Regarding a method of suppressing howling occurring in an acoustic feedback loop, a variety of howling cancellers have been suggested which insert (allot) a notch filter at a frequency at which the howling is occurring (for example, refer to Patent Document 1). Since the howling may occur at a plurality of frequencies at the same time, it is necessary to insert a plurality of the notch filters having different frequencies. However, the number of the notch filters is limited by performance of hardware configuring the howling canceller. Therefore, when new howling is detected after all notch filters are inserted (i.e., when the number of the notch filters becomes insufficient), the howling canceller should release the notch filter already inserted.

According to a howling removal apparatus disclosed in Patent Document 1, when the number of the notch filters becomes insufficient, the notch filter having the longest insertion time is released and the corresponding notch filter is inserted to suppress the newly detected howling.

RELATED TECHNICAL DOCUMENTS

Patent Documents

[Patent Document 1] JP 2008-005305A

SUMMARY OF THE INVENTION

Problems to be Solved

Since the notch filter is provided to rapidly decrease a gain of a predetermined bandwidth, a sound quality may be deteriorated. However, according to the howling removal apparatus disclosed in Patent Document 1, the notch filter inserted already is not released until the number of the notch filters becomes insufficient. In some circumstances, a case may be considered in which the howling is suppressed. However, according to the howling removal apparatus disclosed in Patent Document 1, the notch filter of the frequency at which the howling is being removed by a change of the acoustic feedback loop and the like may remain as it is inserted.

Accordingly, an object of the invention is to provide a howling canceller that appropriately releases a notch filter, depending on occurrence circumstances of howling.

Means for Solving the Problems

A howling canceller of the invention is a howling canceller that is adapted to an acoustic system having a speaker and a microphone, the howling canceller comprising:

a filter insertion unit that inserts a notch filter at a frequency of an audio signal picked up by the microphone;

a setting unit that sets insertion time of the notch filter on the basis of the frequency at which the notch filter is inserted; and a release unit that, when the insertion time set by the setting unit has elapsed, releases the notch filter in which the insertion time has elapsed, wherein the setting unit sets the insertion time of the notch filter to be shorter as the frequency at which the notch filter is inserted increases.

Preferably, the howling canceller further comprises a moving amount detection unit that detects a moving amount of the microphone. The setting unit sets the insertion time of the notch filter to be shorter as the moving amount of the microphone detected by the moving amount detection unit increases.

Preferably, the howling canceller further comprises a range setting unit that sets a movable range of the microphone, and the setting unit determines a threshold value dividing the frequency of the audio signal picked up by the microphone into a low-band and a high-band, based on the movable range of the microphone set by the range setting unit, and sets the insertion time of the notch filter in the low-band and the insertion time of the notch filter in the high-band differently.

Preferably, the setting unit sets the insertion time of the notch filter to be inserted in the high-band to be shorter than that of the notch filter to be inserted in the low-band.

Preferably, the filter insertion unit inserts notch filters for low-band and notch filters for high-band in a low-band and a high-band of the frequency of the audio signal picked up by the microphone, respectively, and sets the upper limit of the number of the notch filters for low-band to be inserted in the low-band.

Preferably, the filter insertion unit sets the upper limit of the number of a plurality of notch filters to be inserted at the frequency of the audio signal picked up by the microphone, and when the number of the notch filters to be inserted at the frequency of the audio signal picked up by the microphone reach the upper limit, the setting unit suppresses a band, which includes a plurality of frequencies that have been suppressed by the notch filters inserted in a high-band, by one notch filter.

Preferably, the howling canceller further comprises a moving amount detection unit that detects a moving amount of the microphone, the setting unit sets a threshold value dividing the frequency of the audio signal picked up by the microphone into a low-band and a high-band, based on the moving amount of the microphone detected by the moving amount detection unit, and when the threshold value is set, the release unit releases the notch filter inserted in the high-band.

Preferably, the moving amount detection unit has an acceleration sensor that is provided on the microphone, and detects the moving amount of the microphone by the acceleration sensor.

Preferably, the moving amount detection unit measures a distance between the microphone and the speaker by detecting sound emitted from the speaker by the microphone, and detects the moving amount of the microphone, based on the measured distance.

Preferably, the howling canceller further comprises a threshold value setting unit that sets a threshold value dividing the frequency of the audio signal picked up by the microphone into a low-band and a high-band, and the setting unit sets the insertion time of the notch filter in the high-band to be shorter in accordance with the frequency at which the notch filter in the high-band is inserted increases while the notch filter inserted in the low-band is not released.

Effects of the Invention

The howling canceller of the invention can appropriately release the notch filter, depending on the occurrence circumstances of the howling.

BRIEF DESCRIPTION OF THE DRAWINGS

FIG. 2 shows examples of a filter coefficient.

DETAILED DESCRIPTION OF ILLUSTRATIVE EMBODIMENTS

First Illustrative Embodiment

Figure 1:
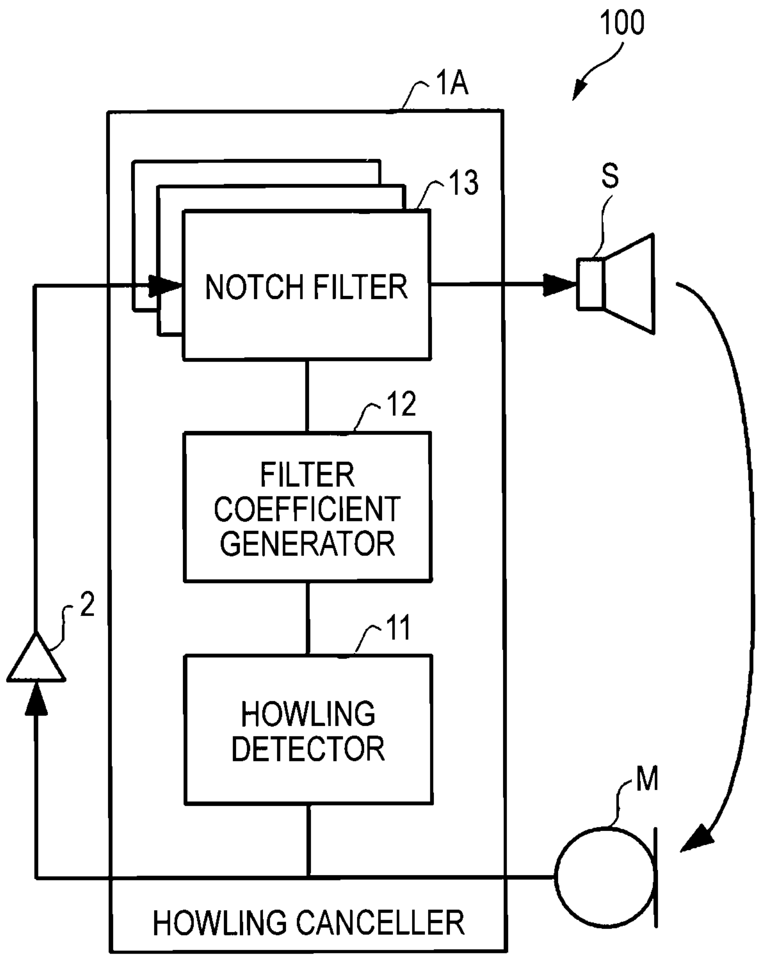
FIG. 1 is a block diagram showing functions and configurations of an acoustic system.

An acoustic system 100 having a howling canceller 1A according to a first illustrative embodiment is described with reference to FIG. 1. FIG. 1 is a block diagram showing functions and configurations of the acoustic system. As shown in FIG. 1, the acoustic system 100 includes a microphone M, the howling canceller 1A, an amplifier 2 and a speaker S. In the acoustic system 100, a sound signal picked up by the microphone M is amplified in the amplifier 2 and then emitted from the speaker S, as sound. The sound emitted from the speaker S is again picked up by the microphone M. In the acoustic system 100, the sound emitted from the speaker S is returned to the microphone M and amplified in the amplifier 2, so that a closed loop is formed. When a loop gain of the closed loop exceeds 1, howling occurs. Accordingly, in the acoustic system 100, the occurring howling is removed by the howling canceller 1A.

In the below, functions and configurations of the acoustic system 100 are described. The microphone M picks up surrounding sound (which also includes the sound emitted from the speaker S) to generate a sound signal and outputs the sound signal to the howling canceller 1A and the amplifier 2.

The amplifier 2 amplifies the input sound signal and outputs the amplified sound signal to notch filters 13 of the howling canceller 1A.

The howling canceller 1A suppresses frequency components of the input sound signal at which the howling is occurring. The howling canceller 1A has a howling detector 11, a filter coefficient generator 12 and the plurality of notch filters 13. The number of the notch filters 13 is limited, based on performances and settings of hardware (micro computer and the like) configuring the filters. Also, the howling canceller 1A outputs the sound signal input from the microphone M to the howling detector 11.

The howling detector 11 performs fast Fourier transform processing for the input sound signal and thus converts the sound signal into a frequency spectrum. The howling detector 11 detects, from the frequency spectrum, frequency components having a predetermined power level or higher (i.e., frequency components at which the howling is occurring) and outputs the same to the filter coefficient generator 12.

The filter coefficient generator 12 controls insertion and release of the notch filters 13. Specifically, the filter coefficient generator 12 generates filter coefficients that suppress the predetermined frequency components (frequency components at which the howling is occurring) of the sound signal input from the amplifier 2. Also, when time during which the notch filter 13 has been inserted becomes greater than insertion time (when it is time to release the filter 13), the filter coefficient generator 12 releases the notch filters 13. The detailed processing of the filter coefficient generator 12 will be described later.

The notch filters 13 suppress the frequency components of the sound signal input from the amplifier 2, at which the howling is occurring, and outputs the same to the speaker S.

The speaker S emits sound, based on the sound signal (i.e., sound signal after the frequency components at which the howling is occurring are suppressed) input from the howling canceller 1A.

In the followings, the detailed processing of the filter coefficient generator 12 is described with reference to FIG. 2. FIG. 2 shows an example of a list (filter table) of the inserted notch filters. The filter coefficient generator 12 stores therein the filter table shown in FIG. 2 and generates a plurality of notch filters (filter coefficients) corresponding to various parameters of the filter table. In the filter table, central frequencies, bandwidths and gain amounts to be attenuated of the notch filters are registered for each of the notch filters 13 (filter 13A, filter 13B, filter 13C, . . . ). The notch filters 13 attenuate the gain amounts for signals having the bandwidths centering on the central frequencies. For example, the filter 13A attenuates the gain by 24 dB for a sound signal having a band of 95 Hz to 105 Hz (bandwidth of 10 Hz centering on 100 Hz). The filter 13C attenuates the gain by 24 dB for a sound signal having a band of 1.15 kHz to 1.25 kHz (bandwidth of 0.1 kHz centering on 1.2 kHz). In the meantime, the gain amount to be attenuated is not limited to 24 dB. Also, the bandwidth is not limited to 10 Hz and 0.1 kHz.

The filter coefficient generator 12 controls the insertion and release of the notch filters 13 by registering and deleting the central frequencies, bandwidths and gain amounts in the filter table. Specifically, when inserting the notch filter 13, the filter coefficient generator 12 registers the central frequency at which the notch filter 13 is inserted, the bandwidth and the gain amount in the filter table. When releasing the notch filter 13, the filter coefficient generator 12 deletes the central frequency at which the notch filter 13 is inserted, the bandwidth and the gain amount from the filter table. Then, the filter coefficient generator 12 generates the filter coefficients, based on the various parameters registered in the filter table.

When the frequency components (frequency components at which the howling is occurring) are input from the howling detector 11, the filter coefficient generator 12 inserts the notch filters 13 so as to suppress the frequency components. That is, the filter coefficient generator 12 registers the bandwidths and the gain amounts in the filter table while using the corresponding frequencies as the central frequencies.

Also, the filter coefficient generator 12 stores the insertion time of the respective notch filters 13 and deletes the central frequency, the bandwidth and the gain amount of the notch filter 13 that has reached the time at which the notch filter should be released.

In the below, the insertion time of the respective notch filters 13 is described. In general, a frequency at which howling is occurring is determined by installation environments (for example, a size and a shape of a room in which the acoustic system is provided), using circumstances (for example, a distance between the microphone and the speaker and air flow caused due to moving of a person) and the like. The closed loop is determined depending on the installation environments. In the closed loop, when a phase of a specific frequency component is aligned, the loop gain is increased. When the loop gain exceeds 1, the howling occurs.

For a low frequency, a wavelength thereof is long, so that the occurrence of the howling is little influenced by a change in a path length of the closed loop and is highly influenced by the other installation environments such as reflection on a wall surface. Therefore, for the low frequency, even when the microphone M is moved, the occurrence of the howling is little influenced by the phase change in the closed loop and the loop gain is hard to become less than 1. Hence, it is preferable to set the long time until it is time to release the notch filters 13.

On the other hand, for a high frequency, a wavelength thereof is short, so that the occurrence of the howling is easily influenced by the change in the path length of the closed loop. Thus, for the high frequency, when the microphone M is moved, the occurrence of the howling is influenced by the phase change in the closed loop and the loop gain easily becomes less than 1. Hence, it is preferable to set the short time until it is time to release the notch filters 13.

Accordingly, the filter coefficient generator 12 sets insertion time (time from the insertion of the notch filter 13 to the release thereof) of the notch filter 13 to be longer as the frequency decreases and sets the insertion time of the notch filter 13 to be shorter as the frequency increases. The filter coefficient generator 12 provides a counter C for each notch filter 13. The counter C indicates an addition value of a count value per unit time and is expressed by following equations 1 and 2.

$$C=C+Y(F) \qquad \text{equation 1}$$

$$Y(F)=\log_k F(k\text{: integer}) \qquad \text{equation 2}$$

When a value of the counter C exceeds a predetermined value, the filter coefficient generator 12 determines that the time that has elapsed after inserting the corresponding notch filter 13 reaches the insertion time (the insertion time of the notch filter 13 has elapsed), and releases the notch filter 13 having reached the insertion time.

For example, when $Y(F)=\log_2 F$ is used so as to express a frequency with an octave, the count value of the counter C at 100 Hz is $\log_2 100=6.6439$. The count value of the counter C at 1 kHz is $\log_2 1000=9.9658$ and the count value of the counter C at 10 kHz is $\log_2 10000=13.2877$. That is, the insertion time of the notch filter 13 that is inserted at 100 Hz is about two times longer than that of the notch filter 13 that is inserted at 10 kHz. In the meantime, the value of the integer k is not limited to 2.

Like this, the filter coefficient generator 12 sets the insertion time of the notch filters 13, depending on the occurrence circumstances of the howling. As a result, the filter coefficient generator 12 can appropriately release the notch filters 13, depending on the occurrence circumstances of the howling. Also, the filter coefficient generator 12 can prevent the sound quality from being deteriorated by releasing, in a short time, the suppression of the notch filter 13 for the frequency (high band) at which the presence or absence of the howling is apt to be easily changed due to an influence of the using circumstances.

Figure 3:
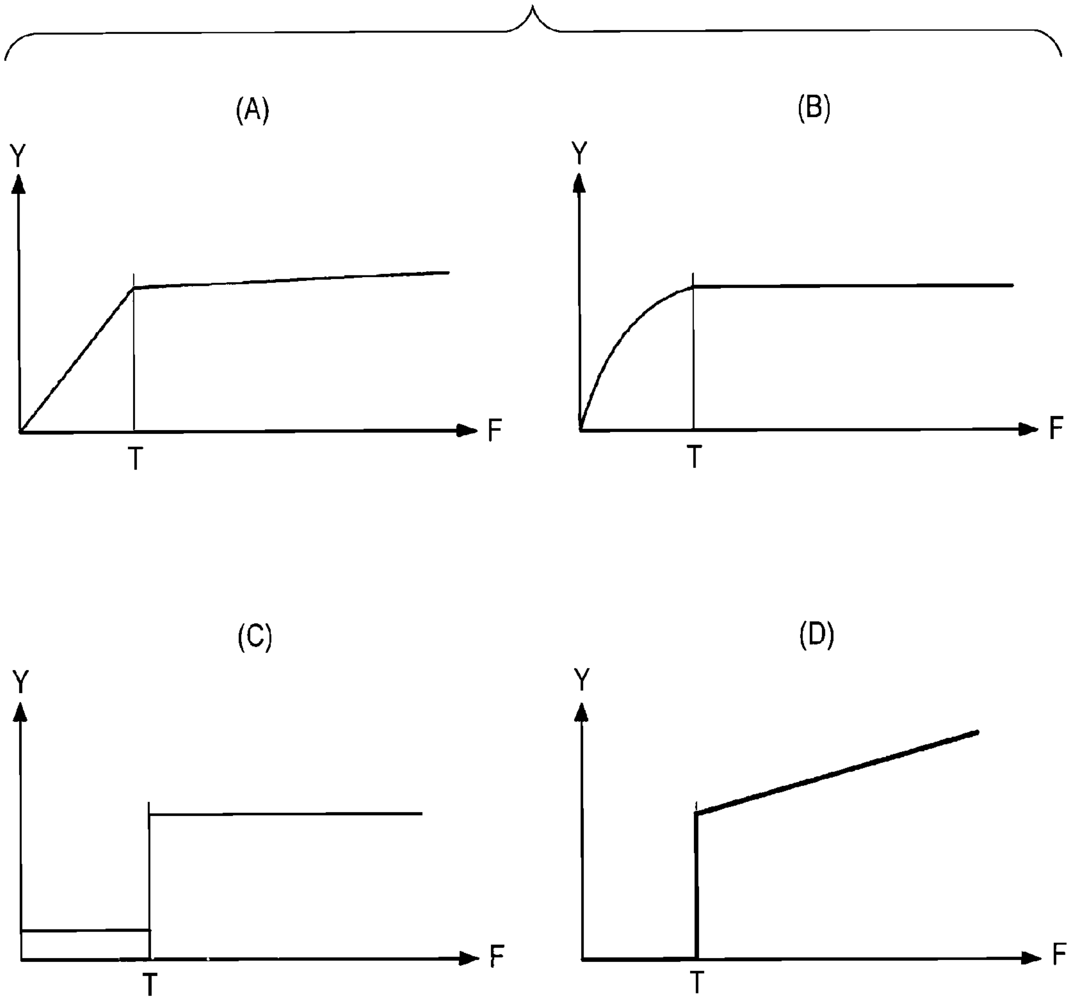
FIGS. 3(A) to 3(D) show examples of a counter table that is used to calculate insertion time of a notch filter.

In this illustrative embodiment, the counter C is calculated by using the equation 2. However, the counter C may be calculated by using any one of counter tables shown in FIGS. 3(A) to 3(D). FIGS. 3(A) to 3(D) show examples of a counter table that is used to calculate the insertion time of the notch filter. In FIGS. 3(A) to 3(D), Y indicates a count value (Y(F) in the equation 2) per unit time for the counter C. F indicates a frequency and T indicates a threshold value between a low-band and a high-band. FIG. 3(A) shows an example in which an increase rate of the counter is high in a low-band and the increase rate of the counter is low in a high-band. FIG. 3(B) shows an example in which an increase rate of the counter is high in a low-band (in particular, the increase rate of the counter is higher as the frequency decreases in the low-band) and the increase rate of the counter is zero (0) in a high-band. That is, an increase amount of the counter is increased in the low-band but is constant in the high-band. FIG. 3(C) shows an example in which increase amounts of the counter in low-band and high-band are constant, respectively, and the increase amounts of the counter in the low-band and the high-band are different from each other. FIG. 3(D) shows an example in which an increase amount of the counter is zero (0) in a low-band (the notch filter that is inserted at the low-band is not released) and an increase rate of the counter is high in a high-band. The filter coefficient generator 12 can shorten the insertion time of the notch filter 13 as the frequency increases, by using the counter tables shown in FIGS. 3(A) to 3(D). As a threshold value between the high-band and the low-band, a predetermined value (for example, 2 kHz, 3 kHz and the like) may be used.

For example, for a howling canceller adopting the counter table shown in FIG. 3(D), when a user turns on an automatic filter release function, a notch filter in a band lower than the threshold value (for example, 2 kHz, which is about 17 cm when it is converted to a movable range) is not released and a notch filter that is inserted in a band of the threshold value or higher is counted up with an addition value that is proportional to the corresponding frequency at which the notch filter is inserted. Accordingly, for the notch filter that is inserted at a frequency of the threshold value or higher, the insertion time thereof is set to be shorter as the frequency increases.

Also, the threshold value between the high-band and the low-band may be calculated on the basis of a movable range of the microphone as described in the below.

A method of calculating the threshold value between the low-band and the high-band based on the movable range of the microphone is described. The frequency F(Hz) is expressed by following equations 3 and 4 when sound speed is V(m/s) and a wavelength is λ(m).

$$F=V/\lambda \qquad \text{equation 3}$$

$$V=340 \qquad \text{equation 4}$$

Here, when the microphone M is moved as an amount corresponding to a half wavelength of sound, it is thought that the howling is removed because a phase is reversed. That is, when a moving amount L of the microphone M is regarded as a half wavelength, it is thought that the howling of the corresponding frequency is removed. Also, since a frequency having a wavelength longer than the moving amount L of the microphone M does not reach the half wavelength, the howling is not suppressed well by the moving of the microphone.

Accordingly, when a frequency F that the moving amount L of the microphone becomes a half wavelength thereof is regarded as a threshold value T between the low-band and the high-band, the threshold value T is expressed by a following equation 5.

$$T=340/2L=170/L \qquad \text{equation 5}$$

In general, the microphone M is held by a speaking person and is moved as the speaking person moves. Thus, the moving amount L of the microphone is calculated, based on a movable range of the speaking person (movable range of the microphone). For example, for a speech on a stage, a speaking person typically speaks with gestures, without frequently moving on the stage, in many cases. Therefore, a moving distance (1 m) of a hand is regarded as a half wavelength. In this case, the threshold value T is 170/1=170 Hz. Also, for example, when a person is moving on the stage, a moving distance (5 m) of on the stage is regarded as a half wavelength. In this case, the threshold value T is 170/5=34 Hz. Like this, the moving amount L of the microphone can be calculated, based on the movable range of the speaking person (the movable range of the microphone), i.e., intended-purposes of the acoustic system.

Like this, the howling canceller 1A can calculate the appropriate threshold value by calculating the threshold value between the high-band and the low-band, while regarding the movable range of the microphone as a half wavelength, depending on the installation environments or using circumstances.

Second Illustrative Embodiment

A howling canceller 1B (not shown) according to a second illustrative embodiment of the invention is described. The howling canceller 1B is different from the howling canceller 1A of the first illustrative embodiment, in that the notch filters 13 for high-band and low-band are provided. In the below, only differences are described. In the meantime, since the howling canceller 1B is different from the block diagram of the howling canceller 1A, in that the notch filters 13 for high-band and low-band are provided, a block diagram of the howling canceller 1B is omitted.

The number of the notch filters 13 provided to the howling canceller is limited, based on performances and settings of hardware (micro computer and the like) configuring the filters. Also, the filter coefficient generator 12 is configured to set the insertion time of the notch filter 13 to be longer as the frequency decreases. Therefore, when the notch filters 13 are shared in the low-band and high-band, the number of the notch filters 13, which are allotted to the low-band, is larger, compared to the notch filters allotted to the high-band.

Thus, in the howling canceller 1B of the second illustrative embodiment, the notch filters are divided into the notch filters for low-band and the notch filters for high-band, and the upper limits of the notch filters for low-band and the notch filters for high-band are respectively set. For example, when a total number of the notch filters 13 is ten, the upper limits thereof are set such as five notch filters for low-band and five notch filters for high-band or six notch filters for low-band and four notch filters for high-band. Thereby, the filter coefficient generator 12 can appropriately allot the notch filters 13 to the low-band and high-band by dividing the notch filters into the notch filters for low-band and the notch filters for high-band and setting the upper limits thereof, without increasing the number of the notch filters to be allotted to the low-band to the extreme degree.

Third Illustrative Embodiment

A howling canceller 1C (not shown) according to a third illustrative embodiment of the invention is described. The howling canceller 1C is different from the howling canceller 1A of the first illustrative embodiment, in that the insertion time is respectively set for each of the notch filters 13 that are divided into the notch filters for low-band, middle-band and high-band. In the meantime, since a block diagram of the howling canceller 1C is the same as the block diagram of the howling canceller 1A, it is not shown.

In the howling canceller 1C of the third illustrative embodiment, the insertion time of the notch filters 13 is changed in the low-band, middle-band and high-band. In the low-band, since the howling is not influenced well by the moving of the microphone M, it is difficult to remove the howling that has once occurred. Therefore, the filter coefficient generator 12 sets so that after the notch filter 13 is inserted in the low-band, it is not released.

In the high-band, the howling is apt to be influenced by the moving of the microphone M and is easily removed by the moving of the microphone. Thus, the filter coefficient generator 12 inserts a wide filter (band suppression filter) having a bandwidth that suppresses a frequency band in the vicinity of the frequency at which the howling has occurred, and sets the insertion time to be short. For example, the insertion time of the notch filter for high-band is shorter than that of the notch filter for middle-band. Also, the bandwidth of the notch filter for high-band is wider than that of the notch filter for middle-band.

In the middle-band, the filter coefficient generator 12 inserts the notch filter 13 at a frequency at which the howling has occurred and sets the insertion time. The filter coefficient generator 12 regards, as the middle-band, a band in the vicinity of a threshold value (which is a predetermined value or a value calculated based on a wavelength) between the low-band and the high-band.

In the meantime, the howling canceller 1C may divide the notch filters 13 into the notch filters for low-band, the notch filters for high-band and the notch filters for middle-band and set the upper limits thereof, like the howling canceller 1B of the second illustrative embodiment.

Like this, in the howling canceller 1C, it is possible to appropriately release the notch filters 13 by changing the bandwidths to be suppressed and the insertion time in the low-band, high-band and middle-band, depending on the occurrence circumstances of the howling.

Fourth Illustrative Embodiment

Figure 4:
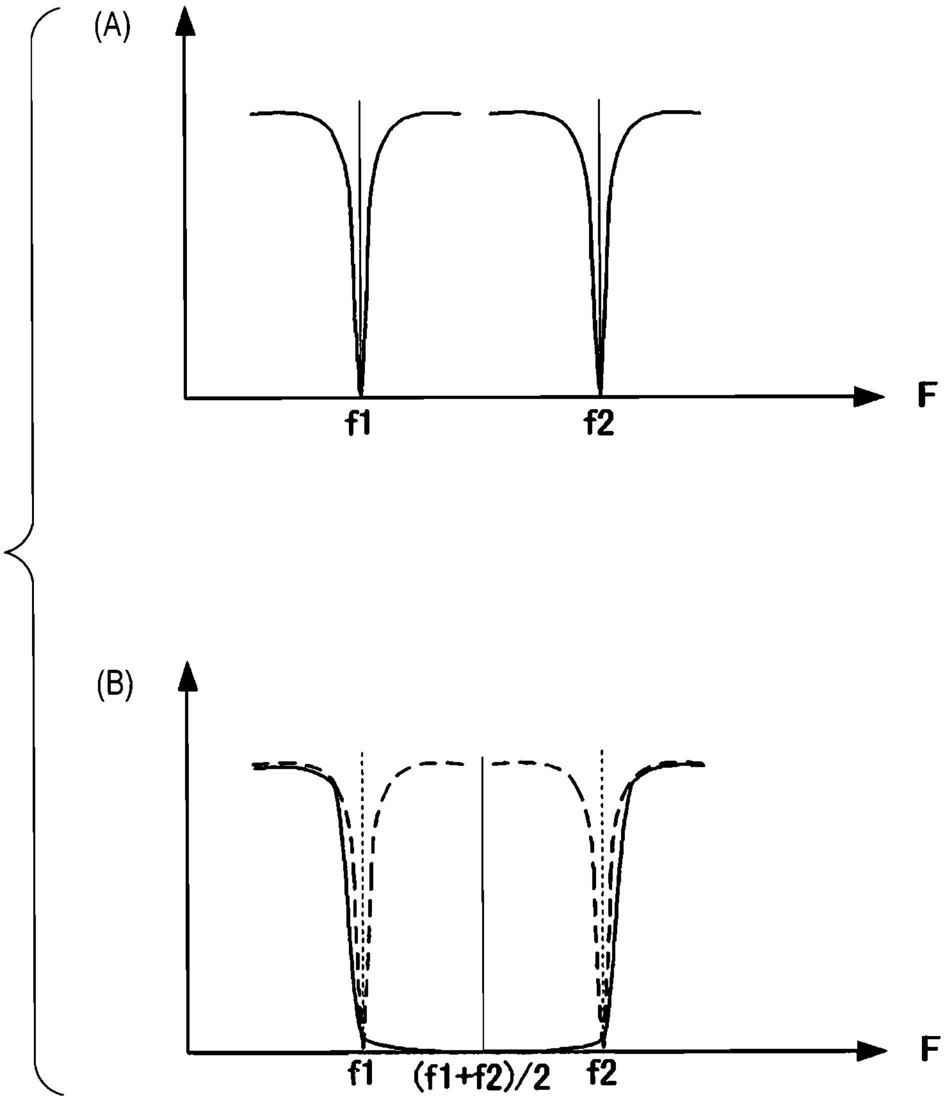
FIGS. 4(A) and 4(B) illustrate a notch filter according to a fourth illustrative embodiment.

A howling canceller 1D (not shown) according to a fourth illustrative embodiment of the invention is described with reference to FIGS. 4(A) and 4(B). FIGS. 4(A) and 4(B) illustrate a notch filter according to the fourth illustrative embodiment. In the fourth illustrative embodiment, the plurality of frequency bands in which the notch filters 13 suppress the gains is incorporated and the suppression is made by one filter (i.e., the notch filters 13 are merged). FIG. 4(A) shows a frequency characteristic before the notch filters 13 are merged and FIG. 4(B) shows a frequency characteristic after the notch filters 13 are merged (refer to the solid line) and a frequency characteristic before the notch filters 13 are merged (refer to the broken line). The howling canceller 1D of the fourth illustrative embodiment is different from the howling canceller 1A of the first illustrative embodiment, in that the plurality of the notch filters 13 is merged. In the meantime, since a block diagram of the howling canceller 1D is the same as the block diagram of the howling canceller 1A, it is not shown.

There is a limit on the number of the notch filters 13 existing at the same time. Therefore, when howling is newly detected after the filter coefficient generator 12 inserts all the notch filters 13, the notch filter 13 for suppressing the newly detected howling becomes insufficient. Hence, the notch filters 13 are merged which are set in the high-band in which the howling is apt to be influenced by the moving of the microphone M.

Specifically, when the notch filter 13 having a frequency f1 as the central frequency and the notch filter 13 having a frequency f2 as the central frequency are inserted (refer to FIG. 4(A)), the filter coefficient generator 12 changes the two notch filters 13 into one notch filter 13 of a wide bandwidth having a central frequency (f1+f2)/2 of the frequency f1 and the frequency f2 as the central frequency (refer to FIG. 4(B)). As a result, since the filter coefficient generator 12 can release the one notch filter 13, the filter coefficient generator can suppress the newly generated howling by using the released notch filter 13.

Also, when merging the two notch filters 13, the filter coefficient generator 12 selects and merges the notch filters 13 whose central frequencies are closest to each other.

Thereby, even when the number of the notch filters 13 becomes insufficient, the filter coefficient generator 12 can suppress the frequency component at which the howling is newly occurring, by merging the notch filters 13. Also, the filter coefficient generator 12 can shorten the suppression time of the frequency component at which the howling does not occur, by merging the notch filters 13 of the high-band whose insertion time is short. As a result, the howling canceller 1A can reduce the deterioration of the sound to be output. Also, the filter coefficient generator 12 can reduce the frequency components to be suppressed, by merging the notch filters 13 whose frequencies are close to each other. As a result, the howling canceller 1A does not further deteriorate the sound to be output.

Fifth Illustrative Embodiment

A howling canceller 1E (not shown) of a fifth illustrative embodiment is described. The howling canceller 1E of the fifth illustrative embodiment is different from the howling canceller 1A of the first illustrative embodiment, in that it releases the notch filters 13, depending on the moving amount L of the microphone M. In the meantime, since a block diagram of the howling canceller 1E is the same as the block diagram of the howling canceller 1A, it is not shown.

The moving amount L of the microphone M is detected by an acceleration sensor (not shown) attached to the microphone M. When the moving of the microphone M is detected by the acceleration sensor, the filter coefficient generator 12 selects the notch filter 13 to be released, based on the moving amount L of the microphone. For example, the filter coefficient generator may calculate a frequency (threshold value) while regarding the moving amount L of the microphone as a half wavelength and then release all the notch filters 13 that are inserted in the band higher than the calculated frequency.

In the meantime, the invention is not limited to the above configuration in which the moving of the microphone M is detected by the acceleration sensor. For example, the moving of the microphone may be detected by measuring a distance between the speaker S and the microphone M. Regarding the method of measuring the distance, a method may be considered in which measuring sound is emitted from the speaker S and then reaching time at which the measuring sound is received after the emission is used.

Like this, the howling canceller 1E can appropriately release the notch filters 13 just by detecting the moving amount L of the microphone, depending on the occurrence circumstances of the howling.

Meanwhile, in the first illustrative embodiment, the moving amount L of the microphone M has been calculated, based on the movable range of the speaking person (the movable range of the microphone). However, it may be also possible that the method of detecting the moving amount L of the microphone described in the fifth illustrative embodiment is applied to the first illustrative embodiment and then the threshold value dividing the low-band and the high-band is calculated based on the detected moving amount L of the microphone.

In the below, the operational effects of the invention are described.

The howling canceller of the invention is applied to an acoustic system having a microphone and a speaker. The howling canceller includes a plurality of notch filters and sets the insertion time of the notch filters, based on the frequencies at which the notch filters are inserted. The howling canceller sets the insertion time of the notch filter that is inserted at the higher frequency to be shorter than that of the notch filter that is inserted at the lower frequency. That is, the higher the frequency at which the notch filter is inserted, the insertion time is set to be shorter.

In general, the frequency at which the howling is occurring is determined by the installation environments (for example, a size and a shape of a living room in which the acoustic system is provided), the using circumstances (for example, a distance between the microphone and the speaker and air flow caused due to the moving of a person) and the like. Also, in the closed loop between the speaker and the microphone, which is one of the occurrence factors of the howling, the phase is aligned, so that the loop gain may be increased. When the loop gain exceeds 1, the howling occurs. That is, for a low frequency, a wavelength thereof is long, so that the influence of the phase change due to the moving of the microphone is little and the influence of the other installation environments such as reflection on a wall surface is high. To the contrary, for a high frequency, a wavelength thereof is short, so that the influence of the phase change due to the moving of the microphone is high.

Thus, the howling canceller of the invention sets the insertion time to be shorter as the frequency at which the notch filter is inserted increases, while regarding that the higher the frequency, the howling is apt to be suppressed by the moving of the microphone.

Like this, the howling canceller of the invention can appropriately release the notch filters, depending on the occurrence circumstances of the howling (i.e., depending on whether the howling is apt to be influenced by the installation environments or whether the howling is apt to be influenced by the using circumstances such as moving of the microphone). Therefore, it is possible to prevent the sound quality from being deteriorated, by switching the gain suppression of the frequency (high frequency) at which the howling is apt to be suppressed, in a short time.

Also, the howling canceller of the invention may have a moving amount input means for inputting the moving amount of the microphone (for example, a setting means for setting the movable range of the microphone, an acceleration sensor attached to the microphone, a means for measuring the distance between the microphone and the speaker, and the like). In this case, the howling canceller shortens the insertion time as the moving amount of the microphone increases.

When the moving amount of the microphone increases, it is possible to easily suppress the howling because the phase is greatly changed. Therefore, the howling canceller sets the insertion time of the notch filter to be shorter as the moving amount of the microphone increases. Thereby, it is possible to prevent the state, in which the gain of the frequency at which the howling has been removed is still suppressed, from being maintained.

Also, the howling canceller of the invention may have a range setting means for setting the movable range of the microphone. In this case, the howling canceller sets the movable range of the microphone, depending on the intended-purposes of the acoustic system to which the howling canceller is applied, determines the threshold value that is a boundary between the low-band and the high-band and differently sets the insertion time of the notch filters in the low-band and high-band divided by the threshold value.

As described above, when the microphone is moved, the phase is changed. However, when the moving amount corresponds to the half wavelength (moving amount whose phase is changed by 180°), it is thought that the howling can be easily suppressed. Therefore, the howling canceller sets the movable range of the microphone beforehand and regards the movable range as a half wavelength. It is considered that for a wavelength (lower frequency) longer than the half wavelength, the howling is difficult to be suppressed even by the moving of the microphone, due to the installation environments, and for a wavelength (higher frequency) shorter than the half wavelength, the howling is apt to be suppressed by the moving of the microphone. Hence, the howling canceller sets a frequency corresponding to the movable range of the microphone as the threshold value and differently sets the insertion time in the frequencies before and after the threshold value, thereby appropriately suppressing the howling.

Also, the howling canceller of the invention may be configured to divide the notch filters into the filters for low-band and high-band and to set the upper limits of the number of the notch filters, respectively.

The lower the frequency, the insertion time is longer. Thus, there is concern that the howling canceller allots the notch filters in the low-band to the extreme degree. Accordingly, the howling canceller of the invention can divide the notch filters into the filters for low-band and high-band and set the upper limits of the number of the notch filters, thereby appropriately allotting the notch filters in the low-band and high-band without excessively allotting the notch filters to the low-band.

Also, the howling canceller of the invention may be configured to suppress the frequencies, which are suppressed by the notch filters inserted at the high-band, by one filter having a wide bandwidth, when the number of the notch filters becomes insufficient.

Since the short insertion time is set and the influence of the sound deterioration is little in the high frequency band, the howling canceller performs the suppression by one notch filter having a wide bandwidth, which is obtained by merging the notch filters, so that it is possible to reduce the number of the notch filters to be used.

Although the invention has been specifically described with reference to the illustrative embodiments, it is obvious to one skilled in the art that the illustrative embodiments can be variously modified and implemented without departing from the spirit and scope of the invention.

The invention is based on the Japanese Patent Application (Patent Application No. 2009-168559) filed on Jul. 17, 2009, the disclosures of which are incorporated herein by reference.

INDUSTRIAL APPLICABILITY

It is possible to provide the howling canceller that appropriately releases the notch filters, depending on the occurrence circumstances of the howling.

DESCRIPTION OF REFERENCE NUMERALS

1A: howling canceller
11: howling detector
12: filter coefficient generator
13: notch filter
2: amplifier
M: microphone
S: speaker

The invention claimed is:

1. A howling canceller that is adapted to an acoustic system having a speaker and a microphone, the howling canceller comprising:

a filter insertion unit that inserts a notch filter at a frequency of an audio signal picked up by the microphone;

a setting unit that sets insertion time of the notch filter on the basis of the frequency at which the notch filter is inserted; and a release unit that, when the insertion time set by the setting unit has elapsed, releases the notch filter in which the insertion time has elapsed, wherein the setting unit sets the insertion time of the notch filter to be shorter as the frequency at which the notch filter is inserted increases.

2. The howling canceller according to claim 1, further comprising:

a moving amount detection unit that detects a moving amount of the microphone, wherein the setting unit sets the insertion time of the notch filter to be shorter as the moving amount of the microphone detected by the moving amount detection unit increases.

3. The howling canceller according to claim 1, further comprising:

a range setting unit that sets a movable range of the microphone, wherein the setting unit determines a threshold value dividing the frequency of the audio signal picked up by the microphone into a low-band and a high-band, based on the movable range of the microphone set by the range setting unit, and sets the insertion time of the notch filter in the low-band and the insertion time of the notch filter in the high-band differently.

4. The howling canceller according to claim 3, wherein the setting unit sets the insertion time of the notch filter to be inserted in the high-band to be shorter than that of the notch filter to be inserted in the low-band.

5. The howling canceller according to claim 1, wherein the filter insertion unit inserts notch filters for low-band and notch filters for high-band in a low-band and a high-band of the frequency of the audio signal picked up by the microphone, respectively, and sets the upper limit of the number of the notch filters for low-band to be inserted in the low-band.

6. The howling canceller according to claim 1, wherein the filter insertion unit sets the upper limit of the number of a plurality of notch filters to be inserted at the frequency of the audio signal picked up by the microphone; and wherein when the number of the notch filters to be inserted at the frequency of the audio signal picked up by the microphone reach the upper limit, the setting unit suppresses a band, which includes a plurality of frequencies that have been suppressed by the notch filters inserted in a high-band, by one notch filter.

7. The howling canceller according to claim 1, further comprising:

a moving amount detection unit that detects a moving amount of the microphone, wherein the setting unit sets a threshold value dividing the frequency of the audio signal picked up by the microphone into a low-band and a high-band, based on the moving amount of the microphone detected by the moving amount detection unit; and wherein when the threshold value is set, the release unit releases the notch filter inserted in the high-band.

8. The howling canceller according to claim 7, wherein the moving amount detection unit has an acceleration sensor that is provided on the microphone, and detects the moving amount of the microphone by the acceleration sensor.

9. The howling canceller according to claim 7, wherein the moving amount detection unit measures a distance between the microphone and the speaker by detecting sound emitted from the speaker by the microphone, and detects the moving amount of the microphone, based on the measured distance.

10. The howling canceller according to claim 1, further comprising:

a threshold value setting unit that sets a threshold value dividing the frequency of the audio signal picked up by the microphone into a low-band and a high-band, wherein the setting unit sets the insertion time of the notch filter in the high-band to be shorter in accordance with the frequency at which the notch filter in the high-band is inserted increases while the notch filter inserted in the low-band is not released.

* * * * *